(12) United States Patent
Zhao et al.

(10) Patent No.: US 12,516,693 B2
(45) Date of Patent: Jan. 6, 2026

(54) PRE-TIGHTENING DISC SPRING, ASSEMBLY COMPRISING THE PRE-TIGHTENING DISC SPRING, AND METHOD FOR MANUFACTURING THE PRE-TIGHTENING DISC SPRING

(71) Applicant: AIGI Environmental Inc., Jiangsu (CN)

(72) Inventors: Jingwei Zhao, Nanjing (CN); Jun Zhang, Nanjing (CN)

(73) Assignee: AIGI Environmental Inc., Nanjing (CN)

( * ) Notice: Subject to any disclaimer, the term of this patent is extended or adjusted under 35 U.S.C. 154(b) by 112 days.

(21) Appl. No.: 18/197,247

(22) Filed: May 15, 2023

(65) Prior Publication Data

US 2024/0167501 A1 May 23, 2024

(30) Foreign Application Priority Data

Nov. 21, 2022 (CN) .......................... 202211456142.X

(51) Int. Cl.
*F16B 39/24* (2006.01)
*B21F 3/08* (2006.01)

(52) U.S. Cl.
CPC ................ *F16B 39/24* (2013.01); *B21F 3/08* (2013.01)

(58) Field of Classification Search
CPC .......... F16B 39/24; F16B 39/26; F16B 43/00; F16F 1/32; F16F 1/34

(Continued)

(56) References Cited

U.S. PATENT DOCUMENTS 2,097,713 A * 11/1937 Ashley ...................... B65D 7/24
52/462
2,675,225 A * 4/1954 Migny ...................... F16F 1/32
267/162

(Continued)

FOREIGN PATENT DOCUMENTS

CN 214617451 U 11/2021
EP 2287477 A1 2/2011

(Continued)

OTHER PUBLICATIONS

Schnorr, Disc Springs Handy for Use, 1997 http://www2.schnorr-group.com/uploads/media/handbuch_en.pdf.

*Primary Examiner* — Flemming Saether
(74) *Attorney, Agent, or Firm* — Jeffer Mangels; Butler & Mitchell LLP; Brennan C. Swain, Esq.

(57) ABSTRACT

A pre-tightening disc spring that includes a disc-shaped body formed with a central hole and having opposite first and second contact sides in a thickness direction. The disc-shaped body being a rotation solid formed by rotating a radial section about a central rotation axis by 360 degrees The central rotation axis coinciding with a central axis of the central hole The radial section having a first line segment and an opposing second line segment The first contact side being defined by rotating the first line segment, the second contact side being defined by rotating the second line segment, and a medium-diameter axis being defined to passing a mid-point of the second line segment and extending normally relative to the second line segment The the radial section being mirror-symmetrical relative to the medium-diameter axis.

12 Claims, 7 Drawing Sheets

(58) Field of Classification Search
USPC .......................................... 411/155, 156, 544
See application file for complete search history.

(56) References Cited

U.S. PATENT DOCUMENTS

| | | | | |
|---|---|---|---|---|
| 3,077,218 | A * | 2/1963 | Ziegler | F16B 39/24 |
| | | | | 411/161 |
| 3,313,552 | A * | 4/1967 | Farr | C21D 7/04 |
| | | | | 29/896.9 |
| 3,476,009 | A * | 11/1969 | Markey | F16B 43/00 |
| | | | | 411/11 |
| 4,196,895 | A | 4/1980 | Sullivan | |
| 5,827,025 | A * | 10/1998 | Henriksen | F16B 39/26 |
| | | | | 411/533 |
| 5,857,666 | A * | 1/1999 | Zhi-Peng | F16F 1/32 |
| | | | | 267/164 |
| 10,806,497 | B2 * | 10/2020 | Patty | A61B 17/866 |
| 2007/0086874 | A1 | 4/2007 | Sullivan | |
| 2007/0098524 | A1 * | 5/2007 | Dunlap | F16B 37/00 |
| | | | | 411/533 |
| 2016/0135860 | A1 | 5/2016 | Patty | |
| 2020/0292022 | A1 | 9/2020 | Buchhagen | |

FOREIGN PATENT DOCUMENTS

| | | | |
|---|---|---|---|
| GB | 2504211 A | 1/2014 | |
| JP | S5620844 A | 2/1981 | |
| JP | 2009144883 A | 7/2009 | |

* cited by examiner

PRE-TIGHTENING DISC SPRING, ASSEMBLY COMPRISING THE PRE-TIGHTENING DISC SPRING, AND METHOD FOR MANUFACTURING THE PRE-TIGHTENING DISC SPRING

CROSS-REFERENCE TO RELATED APPLICATIONS

The present disclosure claims priority to Chinese Patent Application No. 202211456142.X, filed on Nov. 21, 2022, the disclosure of which is herein incorporated by reference in their entirety.

FIELD

The present disclosure generally relates to a pre-tightening disc spring, especially a curved pre-tightening disc spring, and more particularly to an assembly comprising such a pre-tightening disc spring.

BACKGROUND

In the mechanical field, if two components will be fastened together by screw fasteners such as a bolt and a nut, a washer is usually placed between one of the screw fasteners and one of the components to be fastened, to disperse a force exerted by the screw fastener on the component and increase friction between them to achieve an effect of anti-loosing. For instance, a conventional washer is usually a flat or open washer. However, such a conventional washer is applicable to a static fastening occasion only. In the static fastening occasion, a load carried by the already fastened component is a static load. However, when the load carried by the already fastened component is a dynamic variable load, the component and the washer cooperating with it will have to be designed by consideration of how to compensate for both displacement loss caused by the dynamic variable load and fastening force (or called as pre-tightening force) loss caused by the dynamic variable load.

Although there exists a disc-shaped washer or a disc-shaped spring in the prior art, the disc-shaped washer or the disc-shaped spring of the prior art cannot compensate for the displacement loss or the pre-tightening force loss caused by a relatively strong dynamic variable load. For instance, although the disc-shaped washer of the prior art is rolled with teeth in its upper and lower flat surfaces, the rolled teeth have an effect of anti-slip and an effect of anti-loosing in the case of the static load only. An elastic force provided by the rolled teeth is too small to compensate for the displacement loss or pre-tightening force loss. For instance again, even if the disc-shaped spring of the prior art can be designed to compensate for the displacement loss and the pre-tightening force loss caused by the static load to some extent, the disc-shaped spring of the prior art cannot be designed to compensate for the displacement loss and the pre-tightening force loss caused by the dynamic variable load.

In equipment of modern manufacturing factories, especially in chemical manufacturing equipment, pipelines are widely used for conveying high-pressure and/or high-temperature fluids, especially corrosive fluids. Usually, a flange is provided between two pipelines to fluid-tightly couple them together in an end-to-end manner. Such pipelines are used under operating conditions in which temperature or pressure fluctuations may usually occur, and have to suffer from strong mechanical vibrations may frequently occur. Under the operating conditions, the disc-shaped spring of the prior art has not met requirements for high-temperature resistance, sealing, and bearing the dynamic variable load. It is desired to design a novel pre-tightening disc spring.

SUMMARY

The present disclosure is aimed at proposing a novel pre-tightening disc spring, especially a curved pre-tightening disc spring, such that a component, which is fastened by a screw fastener in combination with the pre-tightening disc spring, can sufficiently compensate for displacement loss and/or pre-tightening force loss caused by a dynamic variable load, to meet sealing requirements in a high-temperature and high-pressure environment.

According to an aspect of the present disclosure, a pre-tightening disc spring is provided, it comprising a disc-shaped body which is integrally formed, the disc-shaped body being formed with a central hole, the disc-shaped body having a first contact side and a second contact side which are opposite to each other in a thickness direction of the disc-shaped body, the disc-shaped body being a rotation solid formed by rotating a radial section around a central rotation axis by 360 degrees, the central rotation axis coinciding with a central axis of the central hole, the radial section having a first line segment and an opposing second line segment, the first contact side being defined by rotating the first line segment, the second contact side being defined by rotating the second line segment, a medium-diameter axis being defined to passing the mid-point of the second line segment and extending normally relative to the second line segment, the radial section being mirror-symmetrical relative to the medium-diameter axis, the medium-diameter axis being non-parallel to the central rotation axis, the first line segment being arc-shaped, the notch of the arc-shape being oriented towards the mid-point of the second line segment, a point of intersection of the medium-diameter axis and the first line segment being a point such that a vertical distance measured from this point to a straight line segment connecting between both terminals of the second line segment is the greatest one among vertical distances measured from all points in the first line segment to the same straight line segment, wherein in a free state of the pre-tightening disc spring, the minimum thickness between the first and second contact sides of the disc-shaped body is greater than $3/4$ of a free height of the disc-shaped body and greater than $1/12$ of a free outer diameter of the disc-shaped body.

In an embodiment, the second contact side is configured such that:
(A) in the radial section, the second line segment is arc-shaped, and the notches of the first and second arc-shaped line segments are oriented in the same direction; or
(B) in the radial section, the second line segment is arc-shaped, the notches of the first and second arc-shaped line segments are oriented in the same direction, a ridge protrudes outwards from the mid-point of the second line segment by a distance which is equal to or less than the arc-height of the second line segment in the free state of the pre-tightening disc spring; or
(C) in the radial section, the second line segment is straight.

In an embodiment, the first contact side has a surface roughness which is Ra 0.8~1.6.

In an embodiment, the first contact side is a side configured to contact a fastener, and the second contact side is a side configured to contact a component to be fastened.

In an embodiment, when the pre-tightening disc spring is pre-tightened by the fastener, an axial force is exerted by the fastener onto the pre-tightening disc spring, and the force-bearing part on the first contact side shifts from the innermost periphery to the outermost periphery and is finally at a position of the first contact side which is farthest away from the second contact side in the thickness direction.

In an embodiment, the disc-shaped body of the pre-tightening disc spring is plated with a nickel layer having a thickness of greater than 3 μm.

According to another aspect of the present disclosure, a method for manufacturing a pre-tightening disc spring is provided, the method comprising:
  annealing or solution annealing a metal material smelted for preparing the pre-tightening disc spring after the metal material is forged or rolled;
  using a press tool to stamp or turning the metal material to obtain a pre-tightening disc spring blank with leaving a margin of 0.2~0.5 mm;
  finish-machining the pre-tightening disc spring blank such that it has a surface roughness of Ra 1.6~3.2;
  using a composite press tool to press the pre-tightening disc spring blank in a press machine;
  annealing and tempering the pressed pre-tightening disc spring blank, wherein the annealing temperature is greater than 900° C. and the temper temperature is greater than 500° C.; or additionally letting the pre-tightening disc spring blank undergo an aging heat treatment at an aging temperature of greater than 450° C., to ensure that the rockwell hardness reaches HRC 38~50;
  forcibly pressing the pre-tightening disc spring blank for at least three times at room temperature;
  using a shot blasting machine to harden the forcibly pressed pre-tightening disc spring blank or aging-treating the same to further increase its surface strength, thereby a disc-shaped body of the obtained pre-tightening disc spring having a central hole, the disc-shaped body having a first contact side and a second contact side which are opposite to each other in a thickness direction of the disc-shaped body, the disc-shaped body being a rotation solid formed by rotating a radial section around a central rotation axis by 360 degrees, the central rotation axis coinciding with a central axis of the central hole, the radial section having a first line segment and an opposing second line segment, the first contact side being defined by rotating the first line segment, the second contact side being defined by rotating the second line segment, a medium-diameter axis being defined to passing the mid-point of the second line segment and extending normally relative to the second line segment, the radial section being mirror-symmetrical relative to the medium-diameter axis, the medium-diameter axis being non-parallel to the central rotation axis, the first line segment being arc-shaped, the notch of the arc-shape being oriented towards the mid-point of the second line segment, a point of intersection of the medium-diameter axis and the first line segment being a point such that a vertical distance measured from this point to a straight line segment connecting between both terminals of the second line segment is the greatest one among vertical distances measured from all points in the first line segment to the same straight line segment, wherein in a free state of the pre-tightening disc spring, the minimum thickness between the first and second contact sides of the disc-shaped body is greater than ¾ of a free height of the disc-shaped body and greater than 1/12 of a free outer diameter of the disc-shaped body.

In an embodiment, the method further comprises:
  smoothing the first contact side of the pre-tightening disc spring such that its surface roughness reaches Ra 0.8~1.6.

In an embodiment, the disc-shaped body of the pre-tightening disc spring is plated with a nickel layer having a thickness of greater than 3 μm.

According to another aspect of the present disclosure, an assembly fastened by a pre-tightening disc spring as mentioned above is provided, the assembly comprising:
  a bolt passing a central hole of the pre-tightening disc spring;
  a nut screwed with the bolt and contacting a first contact side of the pre-tightening disc spring; and
  a flange, wherein the bolt is configured to pass the flange and the flange is configured to contact a second side of the pre-tightening disc spring, and an axial pre-tightening force is exerted by the nut onto the pre-tightening disc spring such that the pre-tightening disc spring is kept in its pre-tightening state.

Using the technical means of the present disclosure, the disc spring is designed such that when the already fastened component suffers from a dynamic variable load, the disc spring has a higher pre-tightening capacity, a better force compensating capacity, and a better displacement compensating capacity; in the meanwhile the disc spring can provide secondary fastening and compensation for the already fastened component to guarantee a safe fastening strength, and thus a long-term and reliable connection safety. Furthermore, using the technical means of the present disclosure, reduction in strength of the pre-tightening disc spring caused by concentration of stress during fastening can be avoided. Furthermore, the pre-tightening disc spring according to the present disclosure is particularly applicable to high-temperature and high-corrosive operating conditions.

Using the technical means of the present disclosure, by deliberately designing a relationship between the minimum thickness, the free height, and the free outer diameter of the body of the pre-tightening disc spring, the disc spring will have a higher pre-tightening capacity, a better force compensating capacity, and a better displacement compensating capacity; and provide secondary bearing and compensation and is kept with safety strength. Furthermore, according to the present disclosure, the radial section is designed to avoid a problem that the strength of the pre-tightening disc spring is reduced due to concentration of stress or the like.

BRIEF DESCRIPTION OF THE DRAWINGS

The principle and other aspects of the present disclosure will be well understood by the following description in combination of the drawings. It should be noticed that although the drawings may be given in different ratios for clarity, they cannot be regarded to affect understanding of the present disclosure. In the drawings.

EMBODIMENTS

Figure 1:
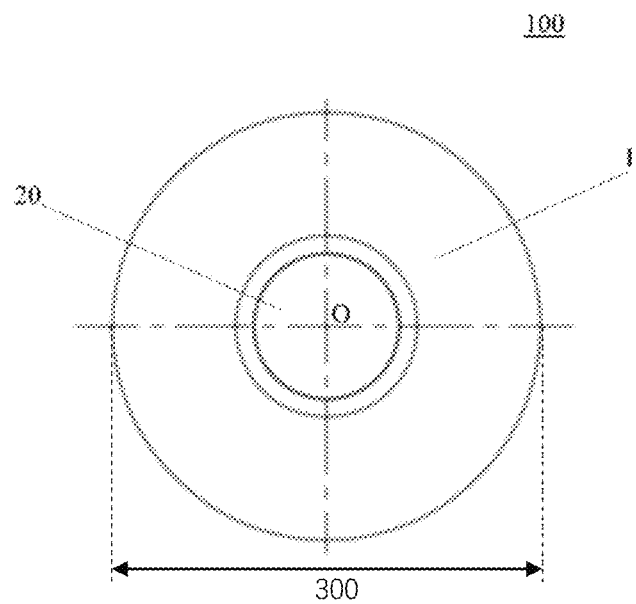
FIG. 1 is a top view schematically illustrating a pre-tightening disc spring according to an embodiment of the present disclosure.

In the drawings of the present disclosure, those features having the same configuration or having a similar function are represented by the same reference numerals, respectively.

FIG. 1 is a top view schematically illustrating a pre-tightening disc spring 100 according to an embodiment of the present disclosure. The pre-tightening disc spring 100 comprises an integrally formed disc spring body 1. The disc spring body 1 is substantially a disc-shaped body having a central hole 20. Therefore, the disc spring body 1 is configured in the form of a solid of rotation around a central axis O thereof. The central hole 20 is configured such that a fastener such as a bolt is able to pass the central hole 20. The disc-shaped body of the disc spring body 1 has two contact sides which are substantially opposite to each other along a thickness direction thereof. The contact sides are configured such that one of them is able to contact a mating fastener such as a nut and the other of them is able to contact a component to be fastened. According to a technical solution of the present disclosure, at least the contact side contacting the nut is arcuate.

Figure 2:
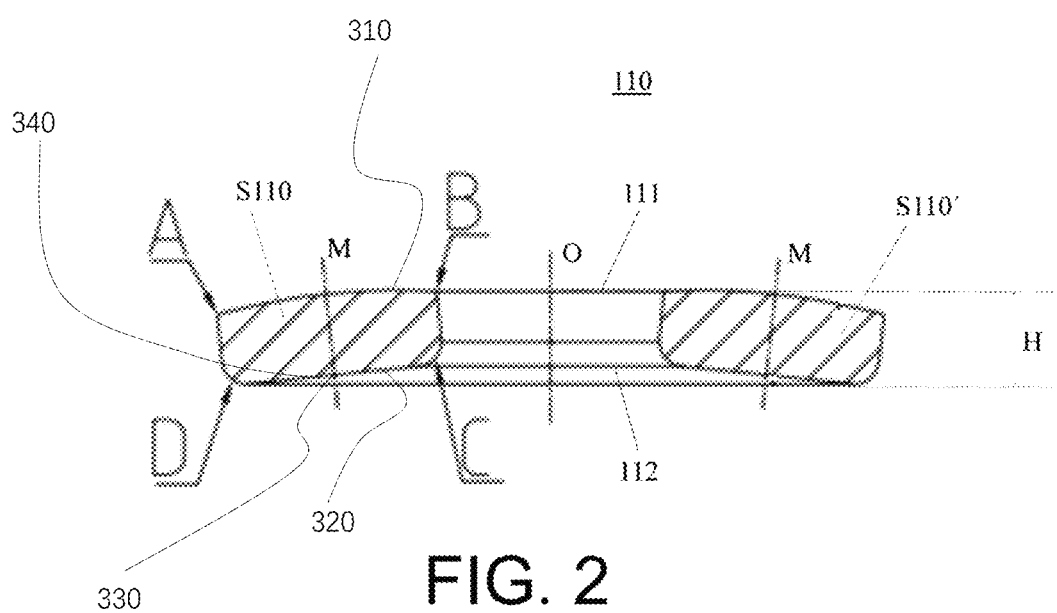
FIG. 2 is a sectional view schematically illustrating the pre-tightening disc spring according to the embodiment of the present disclosure, which sectional view is taken along an imaginary section cutting plane passing a central rotation axis of the pre-tightening disc spring.

FIG. 2 is a sectional view schematically illustrating a pre-tightening disc spring 110 according to a first embodiment of the present disclosure. The sectional view is taken along an imaginary section cutting plane passing a central rotation axis O of the pre-tightening disc spring 110. If a body of the pre-tightening disc spring is regarded as a solid of rotation around the central rotation axis O, the solid of revolution can be formed by rotating a section S110 shown by FIG. 2 around the central rotation axis O by 360 degrees. It should be understood that in the context of the present disclosure, the section (for example the section S110 shown by FIG. 2) of the body of the pre-tightening disc spring can be called as a radial section. This radial section is a section taken radially starting from the central rotation axis O of the body of the pre-tightening disc spring. This section locates in a plane passing the central rotation axis O. This section, after being rotated around the central rotation axis O by 180 degrees, coincides with another radial section (for example a radial section S110' shown by FIG. 2) of the body of the same pre-tightening disc spring. Therefore, the two radial sections are mirror-symmetrical relative to the central rotation axis O.

In FIG. 2, the radial section S110 is shown having four corners A, B, C, and D. A first contact side 111 of the body of the pre-tightening disc spring 110 is formed by rotating a line segment between the corners A and B, around the central rotation axis O, by 360 degrees. A second contact side 112 of the body of the pre-tightening disc spring 110 is formed by rotating a line segment between the corners C and D, around the central rotation axis O, by 360 degrees. An inner wall of the central hole of the body of the pre-tightening disc spring 110 is formed by rotating a line segment between the corners B and C, around the central rotation axis O, by 360 degrees. A peripheral side of the body of the pre-tightening disc spring 110 is formed by rotating a line segment between the corners A and D, around the central rotation axis O, by 360 degrees. The first contact side 111 and the second contact side 112 are opposite to each other substantially in the thickness direction of the body of the pre-tightening disc spring 110. Here, the first contact side 111 is a side configured to contact a nut, and the second contact side 112 is a side configured to contact a component to be fastened.

According to the first embodiment shown by FIG. 2, in the radial section S110, the first line segment 310 between the corners A and B is designed to be arc-shaped or arch-shaped or substantially arc-shaped or substantially arch-shaped, and the second line segment 320 between the corners C and D is designed to be a straight line segment 340 or substantially straight. Particularly, the notch of the arc-shaped or arch-shaped or substantially arc-shaped or substantially arch-shaped first line segment 310 between the corners A and B is oriented towards the line segment or the midpoint 330 of the second line segment 320 between the corners C and D, that is, the point in the first line segment 310 between the corners A and B, with approaching the midpoint between the corners A and B, is increasingly far away from the line segment between the corners C and D. In the radial section S110, an axis M or a medium-diameter axis M is defined to pass the midpoint of the straight line segment between the corners C and D perpendicularly or normally to the same line segment. In a free state of the pre-tightening disc spring 110 (in which free state, no axial force exerted by the respective fastener acts on the disc spring), when the pre-tightening disc spring 110 is placed on a horizontal plane such that the second contact side 112 faces downwards, the second contact side 112 of the pre-tightening disc spring 110 contacts the horizontal plane with its radial outermost periphery (corresponding to the corner D shown by FIG. 2). In a stressed state of the pre-tightening disc spring 110 (in which stressed state, an axial force exerted by the nut on the first contact side 111 is oriented along a direction from the first contact side 111 to the second contact side 112), as the exerted axial force becomes greater, the second contact side 112 of the disc spring 110 will contact a plane of the component to be fastened, with both of its radial innermost periphery (corresponding to the corner C shown by FIG. 2) and its radial outermost periphery (corresponding to the corner D shown by FIG. 2). The current state of the pre-tightening disc spring 110 now can be called as a flattening state, and in the meanwhile a load carried by the pre-tightening disc spring 110 between the nut and the plane of the component to be fastened can be called as a flattening load.

In the flattening state, displacement compensation is not achievable by the pre-tightening disc spring 110 and force compensation is achievable by the same pre-tightening disc spring 110. It should be understood that in the free state of the pre-tightening disc spring 110, the medium-diameter axis is non-parallel to or substantially non-parallel to the central rotation axis in the plane of the radial section.

During application of an axial tightening force onto the pre-tightening disc spring 110, the nut will first contact the innermost periphery of the first contact side 111 (corresponding to the corner B shown by FIG. 2), that is, the axial force-bearing point or part is initially at the innermost periphery. Thereafter, as the axial force becomes greater, the axial force-bearing point or part on the first contact side 111, due to the fact that the first contact side 111 is curved or arched, will shift from the innermost periphery to the outermost periphery. According to an embodiment of the present disclosure, the body of the pre-tightening disc spring 110 is configured such that when the pre-tightening disc spring 110 is in its pre-tightening state, the curved or arched first contact side 111 will let the axial force-bearing point or part mainly focus on a part of the curved or arched first contact side 111 furthest far away from the second contact side 112 along a thickness direction of the pre-tightening disc spring 110. In order to ensure that the axial force in the pre-tightening state can be more evenly distributed onto the second contact side 112 to increase the pre-tightening capacity of the disc spring. According to an embodiment of the present disclosure, in the radial section S110, the thickness of the body of the pre-tightening disc spring 110 decreases or gradually decreases starting from the medium-diameter axis M towards a peripheral side of the body of the pre-tightening disc spring 110 and to an inner wall of the central hole of the body of the pre-tightening disc spring 110 respectively. In other words, a point of intersection of the medium-diameter axis M and the line segment between the corners A and B is a point in the line segment between the corners A and B such that a vertical distance measured from this point to a straight line segment between the corners C and D is the greatest one among vertical distances measured from all points in the line segment between the corners A and B to the straight line segment between the corners C and D.

In a preferred embodiment, the corners B and D of the radial section S110 are rounded corners respectively such that when the body of the pre-tightening disc spring 110 is formed by rotating the radial section S110 around the central rotation axis O by 360 degrees, smooth transition parts are formed between the second contact side 112 of the body of the pre-tightening disc spring 110 and the inner wall of the central hole and between the second contact side 112 of the body of the pre-tightening disc spring 110 and the peripheral side, respectively by those rounded corners, to improve continuity and uniformity of force application during fastening. In the context of the present disclosure, when the thickness of the body of the pre-tightening disc spring 110 is considered, those rounded corners or the smooth transition parts formed by rotating those rounded corners can be omitted. Furthermore, when it is desirable to determine the thickness of the body of the pre-tightening disc spring 110 at a position of the same body, a straight-line distance measured from a point of the second contact side 112, corresponding to the position, along the normal direction of the point to another corresponding point of the first contact side 111 is regarded as the thickness of the body of the pre-tightening disc spring 110 at the position of the same body.

When in the free state of the pre-tightening disc spring 110 it is placed on a horizontal plane with its second contact side 112 facing downwards, a height H measured in the direction of gravity from the horizontal plane to the highest point of the first contact side 111 can be called as a free height of the body of the pre-tightening disc spring 110; at the same time, the outermost diameter of the body of the pre-tightening disc spring 110 can be called as a free diameter of the body of the pre-tightening disc spring 110, and the outermost radius of the body of the pre-tightening disc spring 110 can be called as a free radius of the body of the pre-tightening disc spring 110.

According to a preferred embodiment of the present disclosure, the pre-tightening disc spring 110 can be designed such that the minimum thickness of the body of the pre-tightening disc spring 110 is greater than ¾ of the free height of the body of the pre-tightening disc spring 110 and greater than 1/12 of the free diameter (or outer diameter) of the body of the pre-tightening disc spring 110. Different than a conventional disc spring which is formed with a small thickness and pre-tightened with a less force, the disc spring according to the present disclosure can be formed with a greater thickness and pre-tightened with a greater force.

Figure 6:
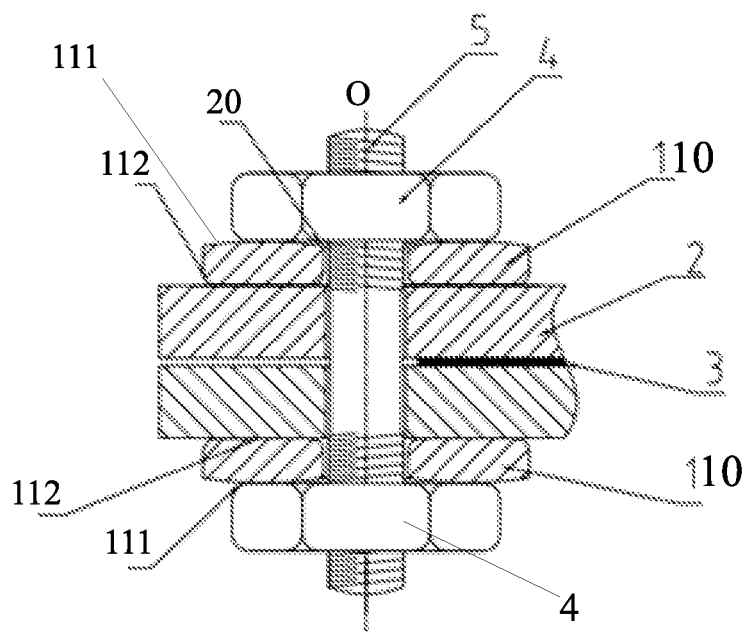
FIG. 6 is a sectional view schematically illustrating how the pre-tightening disc spring of the embodiment shown by FIG. 2 is used to fasten a component.
Figure 7:
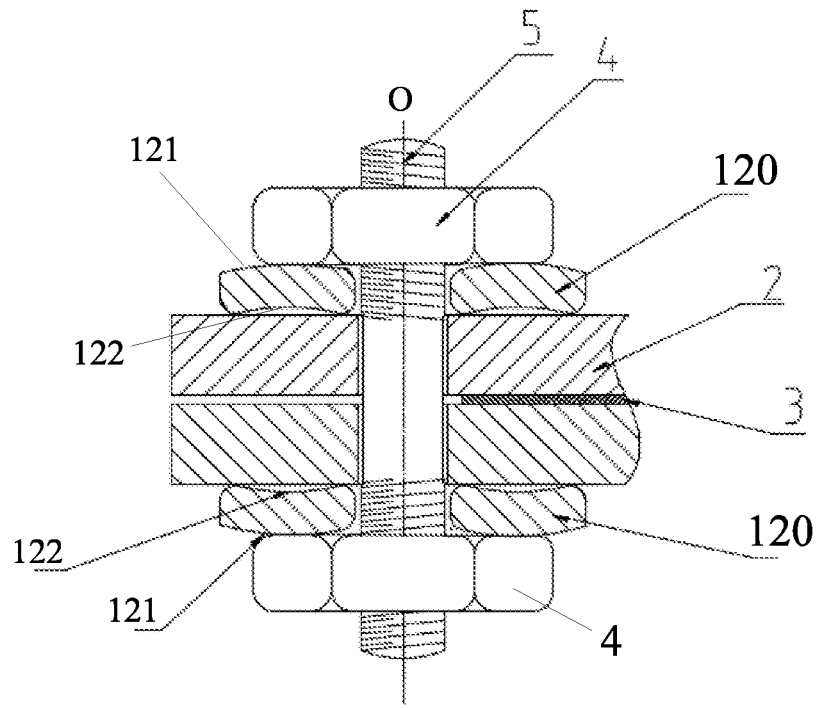
FIG. 7 is a sectional view schematically illustrating how the pre-tightening disc spring of the embodiment shown by FIG. 3 is used to fasten a component.
Figure 8:
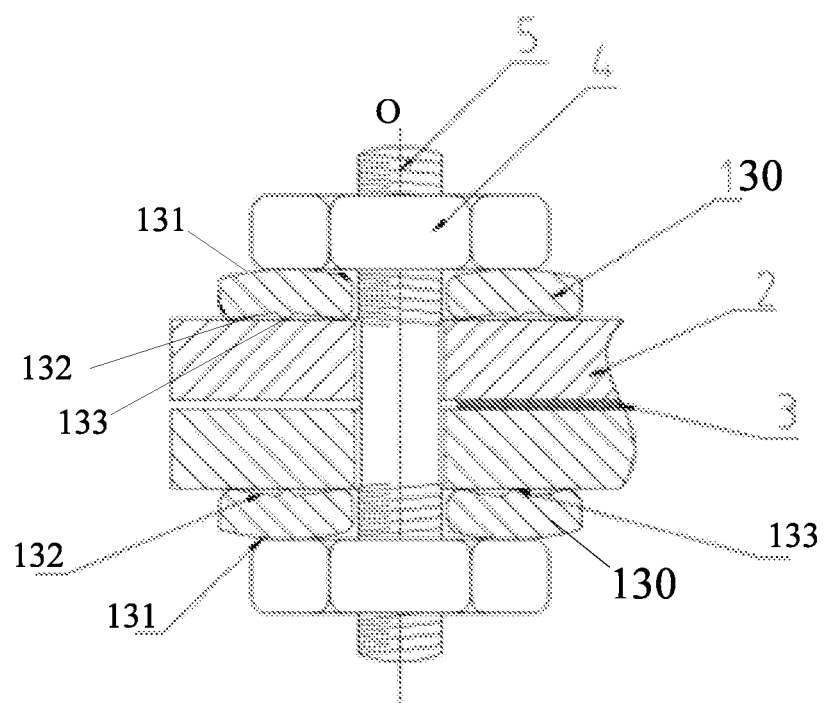
FIG. 8 is a sectional view schematically illustrating how the pre-tightening disc spring of the embodiment shown by FIG. 4 is used to fasten a component.

FIG. 6 schematically illustrates how a component is fastened by a pre-tightening disc spring 110 according to the first embodiment shown by FIG. 2. In the context of the present disclosure, the component to be fastened can be any element in the mechanical field that needs to be fastened. In FIG. 6, two flanges which are used to couple pipelines (not shown) in chemical manufacturing equipment together are represented by a reference numeral "2" respectively; a washer or a seal washer which is arranged between the two flanges 2 to guarantee fluid tightness therebetween is represented by a reference numeral "3"; a bolt which passes central holes of two aligned pre-tightening disc springs 110 and aligned holes of the two flanges is represented by a reference numeral "5"; nuts, which are screwed onto both ends of a bolt respectively to exert an axial pre-tightening force on the pre-tightening disc spring 110 and the flanges, are represented by a reference numeral "4" respectively. It should be understood by a person skilled in the art that in the embodiment in which the flanges are coupled together, each flange can be provided with a plurality of through holes, and a plurality of bolts are arranged to pass the through holes respectively. Each of the plurality of bolts is equipped with a pre-tightening disc spring or pre-tightening disc springs according to the present disclosure such that the disc spring or disc springs can be pre-tightened by screwing the nuts onto the bolt. It should be understood that FIGS. 6, 7 and 8 show only a part of the flanges adjacent to one through hole.

As mentioned above, as the nuts 4 are screwed in, the pre-tightening disc springs 110 will be in the pre-tightening state (for the design of the pre-tightening disc spring 100, its pre-tightening state can be regarded as its flattening state) such that a sufficient pre-tightening force can be exerted between the flanges 2 to guarantee fluid tightness between the pipelines. Because of changing fluid pressure, a constantly axially alternating force will act on the flanges 2. Because of the design of the curved or arched first contact side 111 of the pre-tightening disc spring 110 according to the present disclosure, force compensation can be provided for the constantly axially alternating force such that the sealing washer 3 can be held with a suitable pressure between the flanges 2, to guarantee a reliable fluid-tight connection.

In a preferred embodiment, in order to ensure that the pre-tightening disc springs can be used in corrosion resistant flange connecting situations, the body of the pre-tightening disc spring can be plated with a nickel layer on its surface. The nickel layer can have a thickness of greater than 3 μm (micron).

Figure 3:
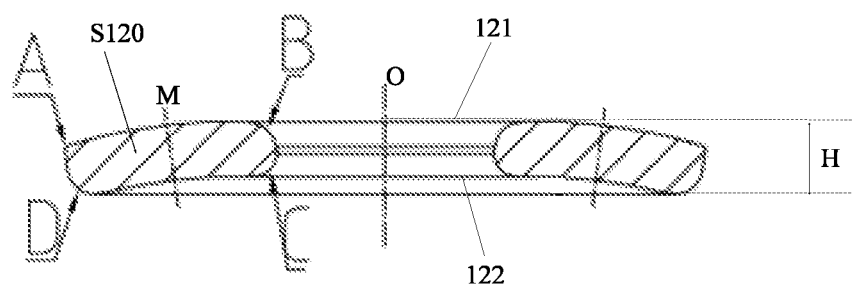
FIG. 3 is a sectional view schematically illustrating a pre-tightening disc spring according to another embodiment of the present disclosure, which sectional view is taken along an imaginary section cutting plane passing a central rotation axis of the pre-tightening disc spring.

FIG. 3 is a sectional view schematically illustrating a pre-tightening disc spring 120 according to a second embodiment of the present disclosure, wherein the sectional view is taken along a section passing a central rotation axis O of the pre-tightening disc spring 120. In the embodiment shown by FIG. 3, a body of the pre-tightening disc spring 120 can be considered to be formed by rotating a radial section S120 around the central rotation axis O of the body of the pre-tightening disc spring 120 by 360 degrees. Although the radial section S120 is also shown with four corners A, B, C, and D, the radial section S120 is different than the embodiment shown by FIG. 2 in that a line segment between the corners C and D is arc-shaped or arch-shaped. That is to say, both of a first contact side 121 and a second contact side 122 of the body of the pre-tightening disc spring 120 which are opposite to each other along a thickness direction thereof are curved or arched. In the radial section S120, notches of the arc-shaped or arch-shaped line segment between the corners A and B and of the arc-shaped or arch-shaped line segment between the corners C and D are oriented towards the same direction, and the notch of the arc-shaped or arch-shaped line segment between the corners A and B faces the line segment or the mid-point of the line segment between the corners C and D. In a preferred embodiment, the line segment between the corners A and B of the radial section S120 is arcuate such that the curvature of the line segment is the same as the curvature of the line segment between the corners C and D of the radial section S120 and/or the curvature center of the line segment coincides with the curvature center of the line segment between the corners C and D of the radial section S120.

In the radial section S120, a medium-diameter axis M is defined to pass the mid-point of the arc-shaped or arch-shaped line segment between the corners C and D normally to the line segment. In a free state of the pre-tightening disc spring 120, in the radial section S120, a point of intersection of the medium-diameter axis M and the line segment between the corners A and B is a point in the line segment between the corners A and B such that a vertical distance measured from this point to a straight line segment (if existing) between the corners C and D is the greatest one among vertical distances measured from all points in the line segment between the corners A and B to the straight line segment between the corners C and D. Definitions of a free height and a free radius of the pre-tightening disc spring 120 can refer to the embodiment shown by FIG. 2 and will not be explained for simplify. In a preferred embodiment, in order to ensure that the force bearing point can smoothly shift as desired when the disc spring is pre-tightened and/or when displacement compensation is achieved by the pre-tightening disc spring 120, the first contact side of the pre-tightening disc spring is formed as a smooth side, having a surface roughness of Ra 0.8~0.6.

According to a preferred embodiment of the present disclosure, the pre-tightening disc spring 120 can be designed such that the minimum thickness of the body of the pre-tightening disc spring 120 is greater than ¾ of the free height of the body of the pre-tightening disc spring 120 and greater than 1/12 of the free diameter of the body of the pre-tightening disc spring 120. Different than a conventional disc spring which is formed with a small thickness and pre-tightened with a less force, the disc spring according to the present disclosure can be formed with a greater thickness and pre-tightened with a greater force.

The body of the pre-tightening disc spring 120 is designed such that as an axial pre-tightening force is being exerted onto the pre-tightening disc spring 120 by screwing the nuts in, the second contact side 122 of the pre-tightening disc spring 120, in the pre-tightening state thereof, will contact a planar surface of a component to be fastened, with both of the radial innermost periphery (corresponding to the corner C shown by FIG. 3) of the second contact side and the radial outermost periphery (corresponding to the corner D shown by FIG. 3) of the second contact side. In the pre-tightening state, the second contact side 122 of the pre-tightening disc spring 120 does not completely contact the planar surface of the component because of the curved or arched design of the second contact side. Therefore, when an alternating force is applied onto the component, the pre-tightening disc spring 120 will be able to provide not only force compensation but also displacement compensation for the fastened component.

FIG. 7 schematically shows how to fasten flanges 2 by pre-tightening disc springs 120 according to the second embodiment shown by FIG. 3. In FIG. 7, explanations to those features represented by the same reference numerals of FIG. 6 can refer to the contents of FIG. 6, and will not be given below for simplify only. It can be seen that when the pre-tightening disc springs 120 are in their pre-tightening state, the second contact sides 122 of the pre-tightening disc springs 120 have contact the respective flanges 2 respectively with both of the radial innermost periphery and the radial outermost periphery of the second contact sides. However, due to the curved or arched design of the second contact sides 122, a part between the radial innermost periphery and the radial outermost periphery of the second contact sides is still not in contact with the respective flanges 2. When the alternating force is applied onto the flanges 2 by a pressure fluid, the force acting between the flanges 2 will change and a minor relative displacement change may exist between the flanges 2. Using the pre-tightening disc spring (s) 120 according to the present disclosure, both of force compensation and displacement compensation can be achieved, such that the two flanges 2 can be kept together with a sufficient and even pre-tightening force and the seal washer 3 can be suitably clamped to guarantee a reliable fluid-tight connection.

Figure 4:
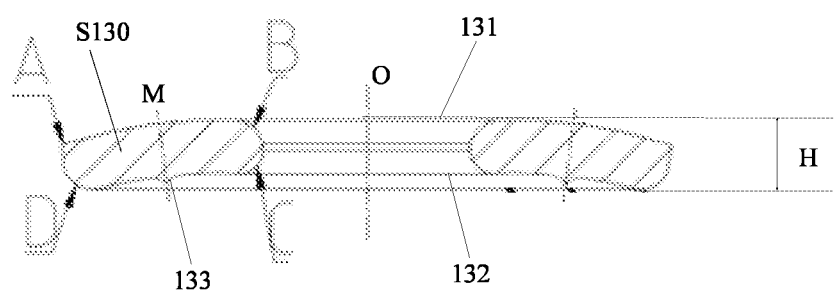
FIG. 4 is a sectional view schematically illustrating a pre-tightening disc spring according to another embodiment of the present disclosure, which sectional view is taken along an imaginary section cutting plane passing a central rotation axis of the pre-tightening disc spring.

FIG. 4 is a sectional view schematically illustrating a pre-tightening disc spring 130 according to a third embodiment of the present disclosure, wherein the sectional view is taken along a section passing a central rotation axis O of the pre-tightening disc spring 130. The embodiment shown by FIG. 4 is different than the embodiment shown by FIG. 3 in that a second contact side 132 of a body of the pre-tightening disc spring 130 is formed with an annular ridge 133. Therefore, except for the annular ridge 133, explanations to other features of the pre-tightening disc spring 130 can refer to the contents of the second embodiment shown by FIG. 3 or its variations, and will not be given below for simplify.

In a radial section S130 of the pre-tightening disc spring 130, there are four corners A, B, C, and D shown. A line segment between the corners A and B and/or a line segment between the corners C and D is arc-shaped or arch-shaped. In the radial section S130, the ridge 133 protrudes outwards from the line segment between the corners C and D along a medium-diameter axis M. The ridge 133 protrudes outwards from the line segment between the corners C and D by a distance which is not greater than the arc-height or arch-height of the arc-shaped or arch-shaped line segment between the corners C and D in a free state of the pre-tightening disc spring 130.

According to a preferred embodiment of the present disclosure, the pre-tightening disc spring 130 can be designed such that the minimum thickness of the body of the pre-tightening disc spring 130 is greater than ¾ of the free height of the body of the pre-tightening disc spring 130 and greater than 1/12 of the free diameter (or outer diameter) of the body of the pre-tightening disc spring 130. Different than a conventional disc spring which is formed with a small thickness and pre-tightened with a less force, the disc spring according to the present disclosure can be formed with a greater thickness and pre-tightened with a greater force.

The body of the pre-tightening disc spring 130 is designed such that as an axial pre-tightening force is being exerted onto the pre-tightening disc spring 120 by screwing the nuts in, the second contact side 132 of the pre-tightening disc spring 130, in the pre-tightening state thereof, will contact a planar surface of a component, to be fastened, with both of the radial innermost periphery (corresponding to the corner C shown by FIG. 4) of the second contact side and the radial outermost periphery (corresponding to the corner D shown by FIG. 4) of the second contact side. Now, the annular ridge 133 can contact or not contact the planar surface of the component. Therefore, in comparison with the force compensation and the displacement compensation provided by the embodiment shown by FIG. 3, the existence of the annular ridge 133 can guarantee greater force compensation.

FIG. 8 schematically shows how flanges 2 are fastened by pre-tightening disc springs 130 according to the third embodiment shown by FIG. 4. It can be seen that when the pre-tightening disc springs 130 are in their pre-tightening state, the second contact sides 132 of the pre-tightening disc springs 130 have contact the respective flanges 2 respectively with both of the radial innermost periphery and the radial outermost periphery of the second contact sides. In the meanwhile, the annular ridges 133 contact the flanges 2 respectively in a not force-bearing manner or do not contact the flanges 2. In this case, when the flanges 2 are applied with an alternating force by a fluid being conveyed in the pipelines with pressure surge, the pre-tightening disc springs 130 according to the present disclosure can guarantee achievement of both of force compensation and displacement compensation under the premise of a sufficient pre-tightening force. In this way, the seal washer 3 can be suitably clamped to guarantee a reliable fluid-tight connection. Moreover, because the annular ridges 133 will contact the flanges 2 when the alternating force is applied onto the pre-tightening disc springs 130, the required time which it takes the pre-tightening disc springs 130 to thoroughly contact the flanges 2 can be shortened and the contact area between them can increase, resulting in an improved capacity of force compensation.

It is understood by a person skilled in the art that in an alternative embodiment, two or more annular ridges concentric with each other can be provided in the second contact side 132 of the pre-tightening disc spring 130 as long as viewed in the radial section S130 these ridges protrude outwards from the line segment between the corners C and D by a distance which is not greater than the arc-height or arch-height of the arc-shaped or arch-shaped line segment between the corners C and D in the free state of the pre-tightening disc spring 130. For example, in case that two annular ridges concentric with each other are provided, viewed in the radial section S130, the vertical distances of the two ridges measured from the medium-diameter axis M are identical to each other.

In order to explain the advantages of the technical solutions of the present disclosure, Table 1 shows flattening load results obtained in tests carried out for disc springs designed in the prior art and disc springs designed according to the present disclosure.

TABLE 1

| | Test No. | Outer diameter (mm) | Inner diameter (mm) | Free state | | | | Flattening state Flattening load (kN) | Explanation |
| --- | --- | --- | --- | --- | --- | --- | --- | --- | --- |
| | | | | The minimum thickness (mm) | Free height (mm) | The minimum thickness/ Free height = R1 | The minimum thickness/ Free outer diameter = R2 | | |
| The prior art | 1 | 31.56 | 16.46 | 1.8 | 2.58 | 0.7 | 0.06 | 9.67 | R1 < ¾ and R2 < 1/12 |
| | 2 | 44.86 | 22.52 | 2.52 | 3.64 | 0.69 | 0.06 | 12.47 | R1 < ¾ and R2 < 1/12 |
| | 3 | 45.92 | 31.9 | 2.54 | 3.78 | 0.67 | 0.06 | 17.67 | R1 < ¾ and R2 < 1/12 |
| | 4 | 35.5 | 18.3 | 2 | 2.8 | 0.71 | 0.06 | 9.69 | R1 < ¾ and R2 < 1/12 |
| Technical solutions of the present disclosure | 5 | 45.3 | 22 | 5 | 5.68 | 0.88 | 0.11 | 138.79 | R1 > ¾ and R2 > 1/12 |
| | 6 | 90.4 | 45.82 | 7.96 | 9.2 | 0.87 | 0.09 | 322.77 | R1 > ¾ and R2 > 1/12 |
| | 7 | 40.32 | 23.14 | 7.4 | 7.8 | 0.95 | 0.18 | 125.17 | R1 > ¾ and R2 > 1/12 |
| | 8 | 50.68 | 30.88 | 7.4 | 9.44 | 0.78 | 0.15 | 218.27 | R1 > ¾ and R2 > 1/12 |
| | 9 | 43.16 | 25.1 | 3.9 | 4.5 | 0.87 | 0.09 | 43.34 | R1 > ¾ and R2 > 1/12 |
| | 10 | 53.78 | 31.1 | 4.86 | 5.66 | 0.85 | 0.09 | 68.49 | R1 > ¾ and R2 > 1/12 |

TABLE 1-continued

| | | | | | The minimum thickness/ Free height = R1 | The minimum thickness/ Free outer diameter = R2 | Flattening state Flattening load (kN) | |
|---|---|---|---|---|---|---|---|---|
| Test No. | Outer diameter (mm) | Inner diameter (mm) | The minimum thickness (mm) | Free height (mm) | | | | Explanation |
| 11 | 52.8 | 30.9 | 5 | 5.65 | 0.88 | 0.09 | 219.3 | R1 > ¾ and R2 > 1/12 |
| 12 | 52.8 | 30.9 | 5 | 5.64 | 0.88 | 0.09 | 49.8 | R1 > ¾ and R2 > 1/12 |

In Table 1, flattening loads are tested for different sized pre-tightening disc springs. Tests (1) to (4) are carried out for the pre-tightening disc springs of the prior art (the minimum thickness of the pre-tightening disc springs is not greater than ¾ of the free height and not greater than 1/12 of the free outer diameter). Tests (5) to (12) are carried out for the pre-tightening disc springs designed according to the present disclosure (the minimum thickness of the pre-tightening disc springs is greater than ¾ of the free height and greater than 1/12 of the free outer diameter 300). Here, it should be noted that a flattening state of the pre-tightening disc spring refers to a state in which the second contact side of the pre-tightening disc spring is in thorough contact with a component to be fastened, such that no axial displacement will occur between the pre-tightening disc spring and the component. The flattening load refers to a load carried by the pre-tightening disc spring in the flattening state.

By comparison between the flattening load results measured in the tests, it can be seen that the flattening loads of the pre-tightening disc springs designed according to the present disclosure appear to be greater than the flattening loads of the pre-tightening disc springs of the prior art. That is to say, under the premise of the same alternating force, the component can be pre-tightened more reliably by the pre-tightening disc springs designed according to the present disclosure. Especially, by comparison between the results of test (2), test (5) and test (9), it can be seen that when the difference between the outer diameter and the inner diameter of a pre-tightening disc spring is not too much, adjusting R1 and R2 by changing the minimum thickness and the free height can greatly increase the flattening load.

Figure 9:
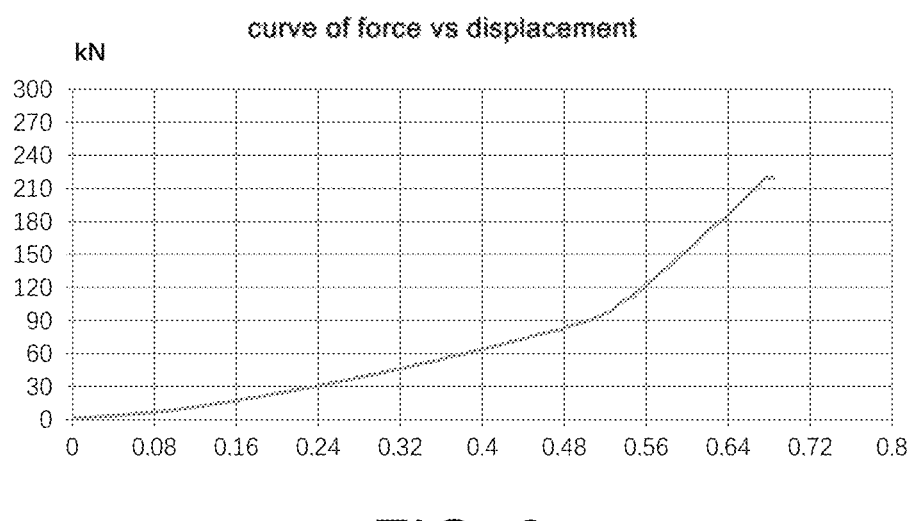
FIG. 9 is a curve chart schematically illustrating a relation of force and displacement of the pre-tightening disc spring of the embodiment shown by FIG. 3.
Figure 10:
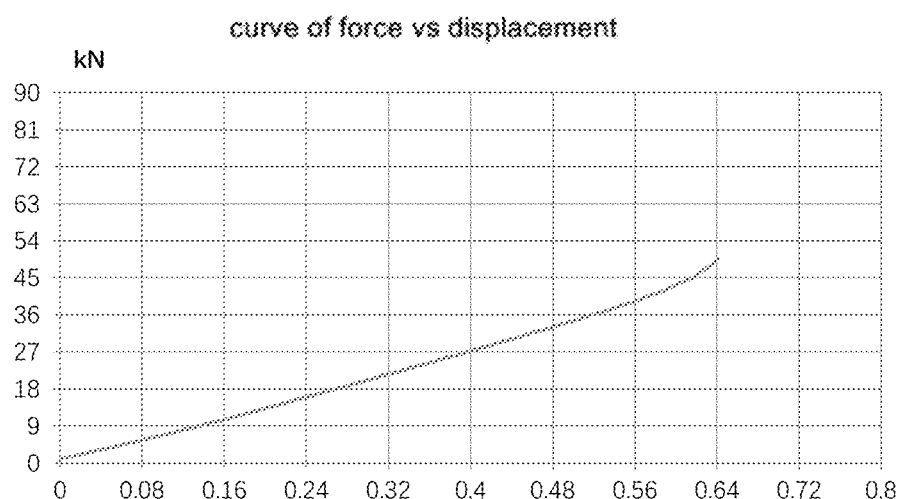
FIG. 10 is a curve chart schematically illustrating a relation of force and displacement of the pre-tightening disc spring of the embodiment shown by FIG. 2.

In Table 1, test (11) was carried out for a pre-tightening disc spring designed according to the second embodiment shown by FIG. 3, and test (12) was carried out for a pre-tightening disc spring designed according to the first embodiment shown by FIG. 2. The two pre-tightening disc springs have the same inner and outer diameters respectively, the same minimum thickness, and slightly different free heights. FIG. 9 shows a force vs displacement curve of test (11), and FIG. 10 shows a force vs displacement curve of test (12). By comparison between the two curves, it can be seen that when both of the first and second contact sides of one pre-tightening disc spring are designed to be curved or arched, the flattening load of the one pre-tightening disc spring is substantively greater than the flattening load of the other pre-tightening disc spring whose first contact side is designed to be curved or arched and whose second contact side is flat. Moreover, when the flattening load is reached, the displacement of the one pre-tightening disc spring is substantively greater than that of the other pre-tightening disc spring. It can be thought out that when a pre-tightening disc spring having the same size as or a similar size to the pre-tightening disc spring of test (11) is formed with an annular ridge, like in the third embodiment shown by FIG. 4, in a body of the pre-tightening disc spring, the flattening load of the pre-tightening disc spring formed with the annular ridge will be greater than the flattening load of test (11); however, the displacement of this pre-tightening disc spring when the flattening load being reached will be less than the displacement of test (11) and greater than the displacement of text (12).

Figure 11:
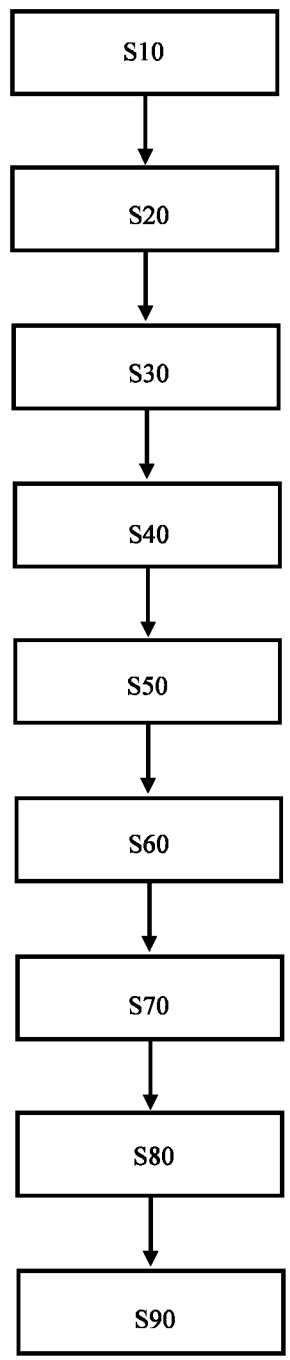
FIG. 11 is a flow chart schematically illustrating a method according to an embodiment of the present disclosure for manufacturing the pre-tightening disc spring.

FIG. 11 is a flow chart schematically illustrating a method or process according to an embodiment of the present disclosure for manufacturing a pre-tightening disc spring of the present disclosure. First, in Step S10, a metal material smelted for preparing the pre-tightening disc spring is forged or rolled, and thereafter, is annealed or solution annealed, wherein the metal material smelted for preparing the pre-tightening disc spring is selected from a group of spring steel, stainless steel, and nickel base alloy. In Step S20, a pre-tightening disc spring blank is stamped by a press tool or turned from the metal material, with leaving a margin of 0.2~0.5 mm (millimeter). In Step S30, the pre-tightening disc spring blank is finish-machined with a surface roughness of Ra 1.6~3.2. In Step S40, in a press machine, the pre-tightening disc spring blank is pressed by a composite press tool. In Step S50, the pre-tightening disc spring blank is preheated according to the material characteristics of the selected metal material, and then is annealed (the annealing temperature is greater than 900° C.) and tempered (the temper temperature is greater than 500° C.), or additionally, undergoes an aging heat treatment at an aging temperature of greater than 450° C. to ensure that the rockwell hardness reaches HRC 38~50. In Step S60, the pre-tightening disc spring blank is forcibly pressed. For example, a single pre-tightening disc spring blank can be forcibly pressed by the press machine for at least three times at room temperature. In Step S70, the forcibly pressed pre-tightening disc spring blank is hardened by a shot blasting machine or aging-treated to further increase its surface strength. In Step S80, a first contact side of the pre-tightening disc spring is smoothed such that the surface roughness reaches Ra 0.8~1.6. Optionally, in Step S90, the pre-tightening disc spring is plated with a nickel layer on its surface. For example, after the surface of the pre-tightening disc spring is de-oiled, washed, and cleaned, it is nickel-electroplated or nickel-electrolessplated such that the nickel layer of the pre-tightening disc spring has a thickness of greater than 3 μm.

Figure 5A:
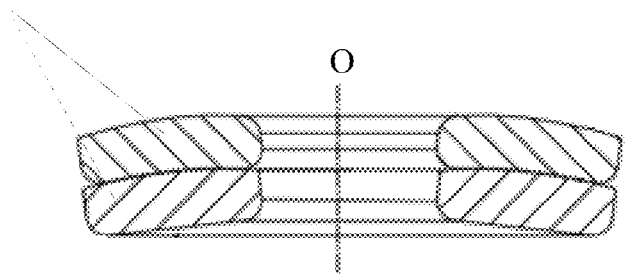
FIGS. 5A, 5B, and 5C are sectional views schematically illustrating feasible arrangement manners of pre-tightening disc springs according to the embodiments of the present disclosure, respectively.
Figure 5B:
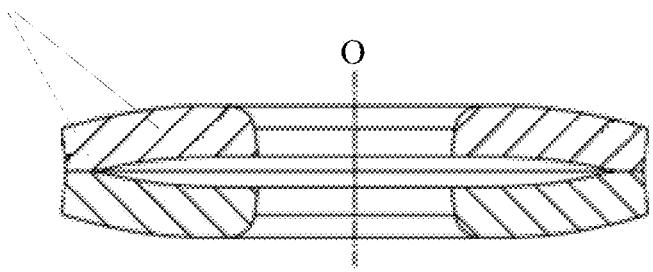
Figure 5C:
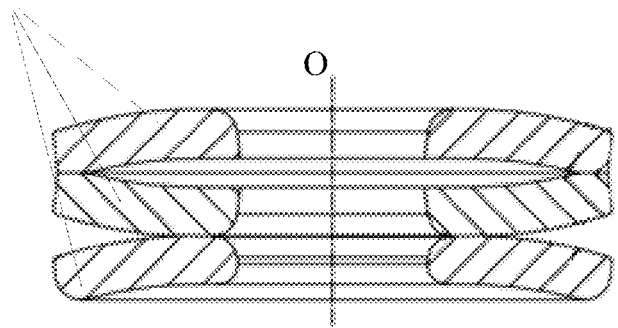

Although in the embodiments shown by FIGS. 7 to 9 only a single pre-tightening disc spring is used at one side of one flange 2, it is conceived by a person skilled in the art that several pre-tightening disc springs according to the present disclosure can be superimposed on each other. Feasible arrangement manners in which the pre-tightening disc springs can be superimposed on each other include but not are limited to those shown by FIGS. 5A to 5C.

Although some specific embodiments of the present disclosure are explained in details, they are given for illustrative purposes only and cannot be regarded to constrain the scope of the present disclosure in any way. Furthermore, it should be understood by a person skilled in the art that the embodiments described here can be arbitrarily combined with each other. Without departing from the spirit and scope of the present disclosure, various replacements, modifications and changes can be thought out.

What is claimed is:

1. A pre-tightening disc spring, comprising:
    a disc-shaped body which is integrally formed, the disc-shaped body being formed with a central hole, the disc-shaped body having a first contact side and a second contact side which are opposite to each other in a thickness direction of the disc-shaped body, the disc-shaped body being a rotation solid formed by rotating a radial section around a central rotation axis by 360 degrees, the central rotation axis coinciding with a central axis of the central hole, the radial section having a first line segment and an opposing second line segment, the first contact side being defined by rotating the first line segment, the second contact side being defined by rotating the second line segment, a medium-diameter axis being defined to passing a mid-point of the second line segment and extending normally relative to the second line segment, the radial section being mirror-symmetrical relative to the medium-diameter axis, the medium-diameter axis being non-parallel to the central rotation axis, the first line segment being arc-shaped, a point of intersection of the medium-diameter axis and the first line segment being a point such that a vertical distance measured from this point to a straight line segment connecting between both terminals of the second line segment is the greatest one among vertical distances measured from all points in the first line segment to the same straight line segment, wherein in a free state of the pre-tightening disc spring, a minimum thickness between the first and second contact sides of the disc-shaped body is greater than ¾ of a free height of the disc-shaped body and greater than 1/12 of a free outer diameter of the disc-shaped body.

2. The pre-tightening disc spring as recited by claim 1, wherein the second contact side is configured such that:
    (A) in the radial section, the second line segment is arc-shaped; or
    (B) in the radial section, the second line segment is arc-shaped, a ridge protrudes outwards from the mid-point of the second line segment by a distance which is equal to or less than the arc-height of the second line segment in the free state of the pre-tightening disc spring; or
    (C) in the radial section, the second line segment is straight.

3. The pre-tightening disc spring as recited by claim 2, wherein the first contact side has a surface roughness which is Ra 0.8~1.6.

4. The pre-tightening disc spring as recited by claim 3, wherein the first contact side is a side configured to contact a fastener, and the second contact side is a side configured to contact a component to be fastened.

5. The pre-tightening disc spring as recited by claim 4, wherein when the pre-tightening disc spring is pre-tightened by the fastener, an axial force is exerted by the fastener onto the pre-tightening disc spring, and the force-bearing part on the first contact side shifts from the innermost periphery to the outermost periphery and is finally at a position of the first contact side which is farthest away from the second contact side in the thickness direction.

6. The pre-tightening disc spring as recited by claim 5, wherein the disc-shaped body of the pre-tightening disc spring is plated with a nickel layer having a thickness of greater than 3 μm.

7. The pre-tightening disc spring as recited by claim 1, wherein the first contact side has a surface roughness which is Ra 0.8~1.6.

8. The pre-tightening disc spring as recited by claim 7, wherein the first contact side is a side configured to contact a fastener, and the second contact side is a side configured to contact a component to be fastened.

9. The pre-tightening disc spring as recited by claim 8, wherein when the pre-tightening disc spring is pre-tightened by the fastener, an axial force is exerted by the fastener onto the pre-tightening disc spring, and the force-bearing part on the first contact side shifts from the innermost periphery to the outermost periphery and is finally at a position of the first contact side which is farthest away from the second contact side in the thickness direction.

10. The pre-tightening disc spring as recited by claim 9, wherein the disc-shaped body of the pre-tightening disc spring is plated with a nickel layer having a thickness of greater than 3 μm.

11. An assembly fastened by a pre-tightening disc spring as recited claim 1, the assembly comprising:
    a bolt passing a central hole of the pre-tightening disc spring;
    a nut screwed with the bolt and contacting a first contact side of the pre-tightening disc spring; and
    a flange, wherein the bolt is configured to pass the flange and the flange is configured to contact a second side of the pre-tightening disc spring, and an axial pre-tightening force is exerted by the nut onto the pre-tightening disc spring such that the pre-tightening disc spring is kept in its pre-tightening state.

12. The assembly as recited by claim 11, wherein the second contact side is configured such that:
    (A) in the radial section, the second line segment is arc-shaped, and the notches of the first and second arc-shaped line segments are oriented in the same direction; or
    (B) in the radial section, the second line segment is arc-shaped, the notches of the first and second arc-shaped line segments are oriented in the same direction, a ridge protrudes outwards from the mid-point of the second line segment by a distance which is equal to or less than the arc-height of the second line segment in the free state of the pre-tightening disc spring; or
    (C) in the radial section, the second line segment is straight.

* * * * *